United States Patent
Harris

(10) Patent No.: US 7,089,037 B2
(45) Date of Patent: Aug. 8, 2006

(54) SYSTEM AND METHOD FOR IMPROVING CAPACITY GAIN WHILE MAINTAINING CALL PERFORMANCE IN A WIRELESS COMMUNICATIONS SYSTEM

(75) Inventor: Mark Harris, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 529 days.

(21) Appl. No.: 10/342,987

(22) Filed: Jan. 15, 2003

(65) Prior Publication Data

US 2004/0137949 A1    Jul. 15, 2004

(51) Int. Cl.
*H04B 1/00* (2006.01)

(52) U.S. Cl. .............. 455/562.1; 455/575.7; 455/97; 455/25; 455/13.3; 455/279.1; 455/129; 455/504

(58) Field of Classification Search ............ 455/562.1, 455/63.4, 279.1, 63.1, 13.3, 25, 19, 82, 83, 455/67.13, 97, 107, 121, 129, 504, 505, 506, 455/575.7
See application file for complete search history.

(56) References Cited

U.S. PATENT DOCUMENTS

| | | | |
|---|---|---|---|
| 5,590,399 A | | 12/1996 | Matsumoto et al. |
| 6,006,113 A | * | 12/1999 | Meredith ............... 455/561 |
| 6,032,056 A | * | 2/2000 | Reudink ............... 455/560 |
| 6,188,896 B1 | * | 2/2001 | Perahia et al. ......... 455/428 |
| 6,289,004 B1 | * | 9/2001 | Mesecher et al. ........ 370/286 |
| 6,393,303 B1 | * | 5/2002 | Katz ............... 455/562.1 |
| 6,411,799 B1 | | 6/2002 | Padovani |
| 6,438,389 B1 | | 8/2002 | Sandhu et al. |
| 6,480,524 B1 | | 11/2002 | Smith et al. |
| 6,771,988 B1 | * | 8/2004 | Matsuoka et al. ....... 455/562.1 |
| 2001/0040880 A1 | | 11/2001 | Chen et al. |

FOREIGN PATENT DOCUMENTS

| | | |
|---|---|---|
| EP | 1059736 A2 | 12/2000 |
| WO | WO 99/57849 | 11/1999 |

OTHER PUBLICATIONS

Soft Handoff and Power Control in IS-95 CDMA; CDMA 95.10; Chapter 10; p. 181, Monday, Dec. 6, 1999.
Freedman, Avi, Hadad, Zion; Handoff Schemes Overview and Guidelines for Handoff Procedures in 802.16; IEEE 802.16 Broadband Wireless Access Working Group, Sep. 21, 2002.

* cited by examiner

*Primary Examiner*—Edan Orgad
*Assistant Examiner*—Shaima Q. Aminzay
(74) *Attorney, Agent, or Firm*—Haynes and Boone, LLP

(57) ABSTRACT

A system and method for maximizing throughput in a telecommunications system is disclosed. The system includes an antenna system using fixed narrow beams that transmits and allows improved capacity gain to be realized without degrading call performance. The system can include: forming a plurality of directional narrow uplink beams at a main antenna; receiving communications signals on the plurality of directional uplink beams; periodically scanning across the plurality of uplink beams associated with a given call; assessing a set of beams from the plurality of uplink beams based upon a quality of reverse link information; selecting a first subset from the set of beams to be turned off when the quality of reverse link information reaches a first predetermined value; and instructing the subset to not transmit a traffic channel and to continue to transmit the power control sub channel.

14 Claims, 2 Drawing Sheets

SYSTEM AND METHOD FOR IMPROVING CAPACITY GAIN WHILE MAINTAINING CALL PERFORMANCE IN A WIRELESS COMMUNICATIONS SYSTEM

BACKGROUND OF THE INVENTION

The following disclosure relates generally to communications systems and, more particularly, to improving capacity gain while maintaining call performance in a wireless communications system.

CDMA digital cellular systems are currently in widespread use throughout North America providing telecommunications to mobile users. In order to meet the demand for transmission capacity within an available frequency band allocation, CDMA digital cellular systems divide a geographic area to be covered into a plurality of cell areas.

A base station is positioned within each cell that communicates to a plurality of mobile stations within the cell. In general, it is desired to have as few base stations as possible, since base stations are expensive, and require extensive effort in obtaining planning permission. In addition, in some areas, suitable base station sites may not be available. In order to minimize the number of base stations, each base station ideally has as large a capacity as possible in order to service as many mobile stations as possible. The key parameters that determine the capacity of a CDMA digital cellular system are: processing gain, ratio of energy per bit to noise power, voice activity factor, frequency reuse efficiency and the number of sectors in the cell-site antenna system.

Therefore, what is needed is a system and method for maximizing capacity gain while maintaining call performance in a telecommunications system.

SUMMARY OF THE INVENTION

The system and method of the present invention includes an antenna system using fixed narrow beams that transmits and allows improved capacity gain to be realized without degrading call performance.

Other aspects and features of the present disclosure will become apparent to those ordinarily skilled in the art upon review of the following description of specific embodiments of the disclosure in conjunction with the accompanying figures.

DETAILED DESCRIPTION OF A PREFERRED EMBODIMENT

Figure 1:
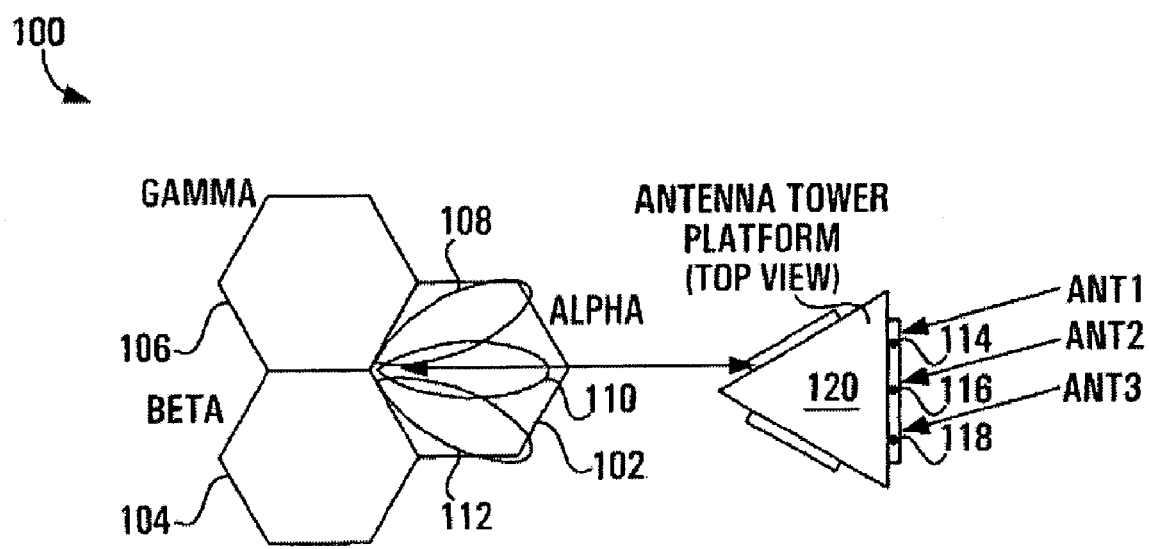
FIG. 1 is a diagram of a conventional tri-cellular CDMA communication cell modified to show 3 narrows beams in place of the normal single wide beam per sector.

The present disclosure relates generally to communications systems and, more particularly, to maximizing throughput in a telecommunications system. It is understood, however, that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

One method of achieving an increase in capacity is to replace a wide beam width antenna with an antenna array that allows the formation of a number of narrower beam widths that cover the area of the original beam. Now turning to FIG. 1, a conventional CDMA communication cell 100 is shown comprising 3 adjacent hexagonal sectors, alpha 102, beta 104 and gamma 106. Each cell 100 includes an antenna tower platform 120 located at the intersection of the 3 sectors. The antenna tower platform 120 has 3 sides forming an equal-lateral triangle. Each sector has 3 antennas: (only the antennas in sector alpha 102 are shown for simplicity) a first antenna 114, a second antenna 116 and a third antenna 112 mounted on a side of the antenna tower platform 120. Each sector also has 3 beams: (only the beams in sector alpha 102 are shown for simplicity) a first beam 108, a second beam 110 and a third beam 112. The 3 beams 108, 110, 112 are adjacent with some overlap in this example. The 3 sectors alpha 102, beta 104 and gamma 106 are identical in structure with respect to antennas and beams.

In operation, the signal for a particular user is sent and received only over the beam or beams that are useful for that user. However the overhead channels are broadcast over all beams within the sector. All beams within the sector use the same PN offset.

Figure 2:
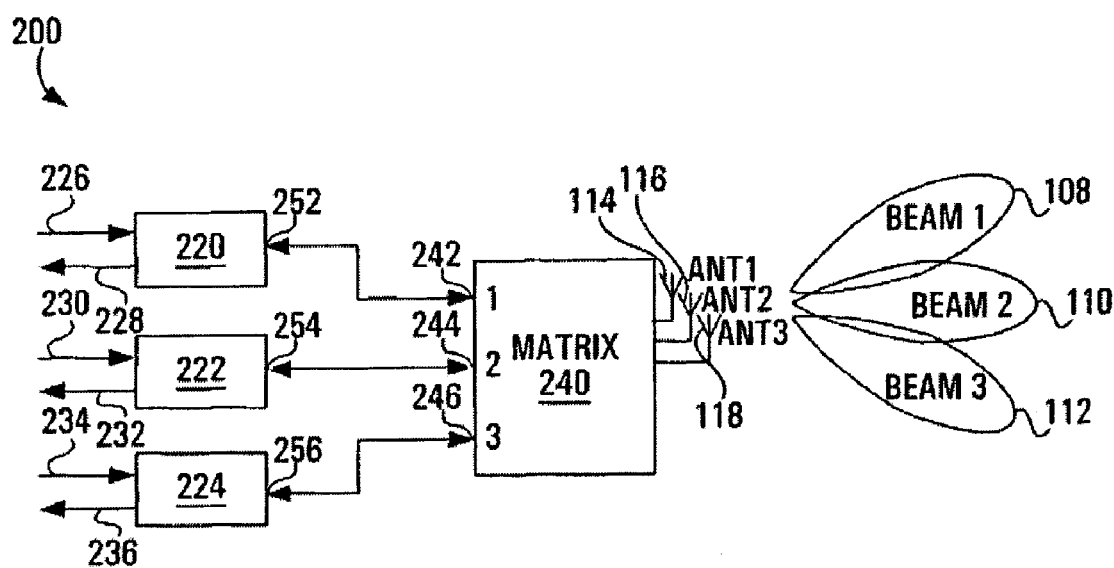
FIG. 2 is a diagram of an antenna system of sector alpha of the CDMA communication cell of FIG. 1.

FIG. 2 shows a conventional antenna system 200 that is within sector alpha 102. The sectors beta 104 and gamma 106 (of FIG. 1) have similar antenna systems to alpha 102. The antenna system 200 defines a first beam 108, a second beam 110 and a third beam 112. The three beams 108, 110, 112 are radiation/reception patterns formed by a first antenna 114, a second antenna 116 and a third antenna 118 respectively. The three antennas 114, 116, 118 are connected to a beam-forming matrix 240 that may be, for example, a Butler matrix. The beam-forming matrix 240 includes three bi-directional ports: a first port 242, a second port 244 and a third port 246. The input signals of the first port 242, the second port 244 and the third port 246 are transmitted on the first beam 108, the second beam 110 and the third beam 112 respectively. The signals received on the first beam 108, the second beam 110 and the third beam 112 are the outputs of the first port 242, the second port 244 and the third port 246 respectively. The antenna system 200 also includes a first transceiver 220, a second transceiver 222 and third transceiver 224. The first transceiver 220 has an input 226, an output 228 and a bi-directional port 252. The second transceiver 222 has an input 230, an output 232 and a bi-directional port 254. The third transceiver 224 has an input 234, an output 236 and a bi-directional port 256. The first port 242, second port 244 and third port 246 of the beam-forming matrix 240 are connected to bi-directional port 252 of the first transceiver 220, bi-directional port 254 of the second transceiver 222 and bi-directional port 256 of the third transceiver 224 respectively.

Although three antennas forming three beams per sector are used in this embodiment, any number of antennas and beams per sector greater than one may be used while remaining within the scope of the invention.

Advantageously, the invention may be used with antenna systems employing diversity schemes, such as space diversity or polarization diversity. In all diversity schemes, overlapping beams should have offset frequencies or time dependent phase offsets.

Call performance will usually not degrade with this type of system as long as traffic channels are supplied when actually required by the mobile. However, if the system performs an incorrect beam selection decision for intra-sector handoffs, call performance deterioration can occur. In addition, when the sector is not the dominant server in the handoff, the reverse link energy is usually low. Moreover, the beam selection algorithm has difficulty accurately determining the correct beam(s) in this situation.

For aggressive capacity gains, beam traffic channels-should be turned off with some level of risk. If the mobile attempts to demodulate a traffic channel that has been turned off, a call drop is possible due to incorrect reception of the Adaptive Antenna Beam Selection (AABS) forward power control sub channel. However, AABS capacity can be improved since only "safe" beams are currently being turned off to preserve call performance.

An enhancement to AABS, is to provide power control sub-channel on beams to be turned off with some risk. The beam selection algorithm assesses the degree of certainty of its decision based on the quality of the reverse link information. The algorithm uses instantaneous and filtered historical reverse link channel estimation measurements. The algorithm also compares against set (but optimizable) thresholds. A forward link loading estimate may optionally be factored into the decision. If the beam selection algorithm decisions are considered certain, maximum capacity gain can be sought with low risk of degrading call performance. Beams to be turned off will not transmit a traffic channel or power control sub-channel (as is currently done). If the beam selection algorithm decisions are uncertain, call performance can be maintained. However capacity gain can remain high in this situation. Beams to be turned off will not transmit a traffic channel, but will continue to transmit the power control sub-channel. However, power up bits will always be sent. Moreover, the digital gain of the power control sub channel is a function of its normal gain and the reverse link signal quality. In addition, capacity gain for uncertain decisions are not as high as certain decisions, since the power control sub-channel carries interference energy.

Thus, the system and method of the present invention allows improved AABS capacity gain to be realized without degrading call performance.

While the preceding description shows and describes one or more embodiments, it will be understood by those skilled in the art that various changes in form and detail may be made therein without departing from the spirit and scope of the present disclosure. For example, it is within the scope of the present disclosure that the BTS, the BSC, and/or the mobile device may not exist in the same fashion in other technologies or implementations, but the same functionality may be achieved using other components. In addition, other methods of obtaining or calculating factors such as the power levels or the rate-to-power ratios may be utilized in developing a desired-solution. Therefore, the claims should be interpreted in a broad manner, consistent with the present disclosure.

What is claimed is:

1. A method of receiving communications call signals in a wireless radio communications system, the method comprising:
    forming a plurality of directional narrow uplink beams at a main antenna;
    receiving communications signals on the plurality of directional uplink beams;
    periodically scanning across the plurality of uplink beams associated with a given call;
    assessing a set of beams from the plurality of uplink beams based upon a quality of reverse link information;
    selecting a first subset from the set of beams to be turned off when the quality of reverse link information reaches a first predetermined value; and
    instructing the first subset to not transmit a traffic channel and to continue to transmit a power control sub channel.

2. The method of claim 1 further including:
    selecting a second subset from the set of beams to be turned off when the quality of reverse link information reaches a second predetermined value; and
    instructing the subset to not transmit a traffic channel and to not transmit a power control sub-channel.

3. The method of claim 1 wherein the assessing the set of beams includes utilizing instantaneous reverse link channel measurements.

4. The method of claim 1 wherein the assessing the set of beams includes utilizing filtered historical reverse link channel measurements.

5. The method of claim 3 wherein the assessing the set of beams further includes comparing reverse link channel measurements against a set of thresholds.

6. A system for receiving communications call signals in a wireless communications system, the system comprising:
    a plurality of directional narrow uplink beams at a main antenna wherein the plurality of directional uplink beams receive communications signals;
    a means for periodically scanning across the plurality of uplink beams associated with a given call;
    a means for assessing a set of beams from the plurality of uplink beams based upon a quality of reverse link information;
    a means for selecting a first subset from the set of beams to be turned off when the quality of reverse link information reaches a first predetermined value; and
    a means for instructing the first subset to not transmit a traffic channel and to continue to transmit a power control sub channel.

7. The system of claim 6 further including:
    a means for selecting a second subset from the set of beams to be turned off when the quality of reverse link information reaches a second predetermined value; and
    a means for instructing the subset to not transmit a traffic channel and to not transmit a power control sub-channel.

8. The system of claim 6 wherein the means for assessing the set of beams includes utilizing instantaneous reverse link channel measurements.

9. The system of claim 6 wherein the means for assessing the set of beams includes utilizing filtered historical reverse link channel measurements.

10. The system of claim 8 wherein the means for assessing the set of beams further includes comparing reverse link channel measurements against a set of thresholds.

11. A method for receiving communications call signals in a wireless communications system, the method comprising:
    forming a first plurality of directional narrow uplink beams at a main antenna;
    receiving communications signals on said first plurality of directional uplink beams;
    periodically scanning across said plurality of first uplink beams associated with a given call;
    assessing a set of beams from the plurality of fist uplink beams based upon a quality of reverse link information;
    selecting a first subset from the set of beams to be turned off when the quality of reverse link information reaches a first predetermined value;

instructing the subset to not transmit a traffic channel and to continue to transmit the power control sub channel;

selecting a second subset from the set of beams to be turned off when the quality of reverse link information reaches a second predetermined value; and instructing the first subset to not transmit a traffic channel and to not transmit a power control sub-channel.

12. The method of claim 11 wherein the assessing the set of beams includes utilizing instantaneous reverse link channel measurements.

13. The method of claim 11 wherein the assessing the set of beams includes utilizing filtered historical reverse link channel measurements.

14. The method of claim 12 wherein the assessing the set of beams further includes comparing reverse link channel measurements against a set of thresholds.

* * * * *